Sept. 29, 1953  H. H. WRIGHT ET AL  2,653,432
SAUSAGE STUFFING MACHINE
Filed May 19, 1949

INVENTORS.
HENRY H. WRIGHT
CLARENCE L. HARDER
BY
ATTORNEY

Patented Sept. 29, 1953

2,653,432

UNITED STATES PATENT OFFICE 2,653,432

SAUSAGE STUFFING MACHINE

Henry H. Wright and Clarence L. Harder, Fredericksburg, Va., assignors to American Viscose Corporation, Wilmington, Del., a corporation of Delaware Application May 19, 1949, Serial No. 94,164

2 Claims. (Cl. 53—61)

This invention relates in general to making stuffed products such as sausages, and in particular to a process and apparatus for the production of sausages.

At the present time the usual apparatus for the manufacture of sausages consists of a large closed chamber equipped with a nozzle through which the sausage meat can be forced by air pressure on the meat in the chamber. In the manufacture of the "skinless" sausage it is customary first to stuff the sausage meat in an artificial seamless casing, and then to cook and smoke the sausage and thereafter peel off the casing. In making "skinless" sausage and other small sausages, a small diameter casing having a length of several feet is shirred onto the nozzle or is pre-shirred and then slipped over the nozzle. The end of the casing is tied, and the casing is then filled with sausage meat. In the manufacture of frankfurters by this process there are required a number of separate hand operations, one for each individual casing, and inasmuch as the length of the individual casing is limited, the interruptions of the stuffing process are numerous and consequently decrease the production. Since the length of the casing is limited by the length of the nozzle over which it must be shirred and the length of the natural casing is limited by the length of the animal organ from which it is obtained, these interruptions cannot be avoided in the conventional process.

On the other hand, in the manufacture of large-sized sausages, such as salami, Bologna and the like, the artificial casing is a large seamless casing not more than about two feet in length. The stuffing of such casings is entirely a discontinuous batch operation.

It is an object of the invention to provide a substantially continuous process for the manufacture of stuffed products in tight-fitting casings.

It is an additional object of the invention to provide a process for the simultaneous formation of casings and the stuffing of the casing under pressure.

It is another object of the invention to provide apparatus for the manufacture of stuffed products, in particular of sausages, and in addition to provide apparatus for the simultaneous formation of casings and the stuffing of products therein.

It is a still further object to provide a stuffed encased sausage suitable for the preparation of the so-called "skinless" frankfurters.

Other objects and advantages will in part be obvious and will in part appear from the following description.

The invention includes a process for the production of stuffed products, such as sausage, which comprises simultaneously forming a continuous tubular casing and stuffing said casing under pressure to produce a stuffed product in a tight fitting casing; more particularly, a process for the production of sausages by the use of a stuffing horn or nozzle and a tubular casing comprising continuously shaping a long piece of flexible sheet material into a tube about a stuffing nozzle, sealing the edges of the sheet with a self-sustaining strip of an adhesive material while the sheet surrounds the nozzle to form a tubular casing and stuffing the casing with sausage meat under pressure concurrently with its formation.

According to the present invention there is also provided an apparatus for the simultaneous manufacture of tubular casings and the stuffing of such casings with plastic materials, such as sausage meat, comprising the combination of a stuffing horn nozzle adapted to fit onto a container for the plastic material, means for continuously shaping a flexible sheet material into a tubular casing about the nozzle, and means for supplying a strip of an adhesive material to the overlapped edges, and means for sealing the edges of the sheet prior to the casing passing off the nozzle.

It is a characteristic feature of the present invention that the tubular casing is stuffed under pressure so as to produce a stuffed product in a tight fitting casing. A second characteristic feature is that the pressure applied to the plastic material, such as a sausage meat, as it is stuffed in the casing causes the casing to be drawn over the nozzle so that while that portion of the sealed casing which extends beyond the end of the nozzle is being stuffed, a succeeding portion is being shaped and sealed into a casing on the nozzle. Thus the operations of forming the casing and stuffing the casing are carried out simultaneously and concurrently.

For a more complete understanding of the present invention, reference should be had to the accompanying drawing, in which Fig. 1 is a side elevation, partly in section, of one embodiment of the apparatus of the invention;

Figure 1:
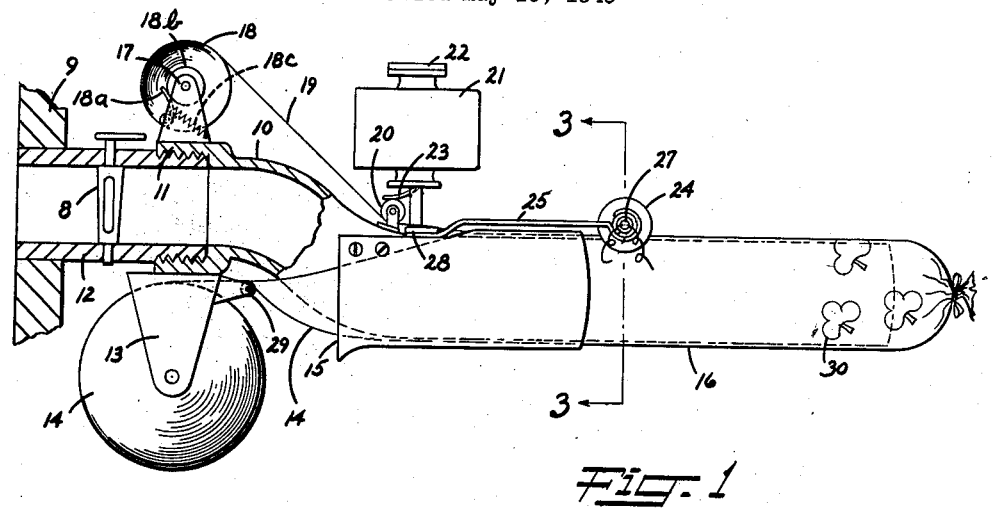

The seamed artificial casing is formed by folding about the stuffing horn a sheet of flexible material, such as synthetic resins, e. g. polyethylene, polymers of vinyl chloride and vinylidene chloride, and copolymers of such chlorides with acrylonitrile, vinyl acetate, etc.; rubber derivatives such as the cyclized rubbers known under the trade name "Pliofilm," rubber hydrochloride; nylon, regenerated cellulose, an alkali-soluble water-insoluble cellulosic material comprising, for example, a carboxylakyl cellulose ether and mixed cellulose ethers of this class, cellulose ether-xanthates cellulose xantho-ethers, cellulose thiourethanes, and cellulose xantho fatty acids.

When the seamed tubing is formed from a hydrophilic cellulosic material, which is water-permeable but greaseproof, it can be used in the conventional methods of manufacturing "skinless" frankfurters. The hydrophilic nature of the casing permits the passage of air and moisture vapor while preventing loss of grease and fat, thus facilitating the formation of a "self-skin" of coagulated protein material on the surface of the meat. In addition, the hydrophilic casing is capable, during stuffing, curing and cooking operations, of shrinking or expanding to conform with the changing size and shape of the sausage without the formation of wrinkles and without bursting. On the other hand, the nonthermoplastic nature of the hydrophilic casing is advantageous in the manufacture of "skinless" sausages since it eliminates adhesion between the casing and the sausage meat and thus facilitates subsequent stripping of the casing.

The sealing thread or strip may be composed of any material thermoplastic or even thermosetting, if still in thermoplastic condition, which is rendered adhesive by heating, or it may comprise any material, whether thermoplastic or not, which is rendered adhesive by the application of a solvent. It may be of the same material as the sheet to be sealed or it may be quite different. Examples of suitable materials include the vinyl resins, particularly those of polyvinyl chloride, copolymers of vinyl chloride with vinyl acetate or acrylonitrile, after-chlorinated vinyl polymers or copolymers, polyvinylidene chloride; also acrylic and methacrylic acid ester resins, such as polymerized methyl methacrylate; chlorinated and cyclized rubbers, such as Pliofilm, rubber hydrochloride, and the like, nylons; cellulose derivatives, such as ethyl cellulose and so on.

The present invention also contemplates the sealing or securing together of the two overlapped edges of the sheet material by means of an interposed composite thread, strand, filament, or the like. The sealing along the joint may be complete or partial, depending upon the extent of closure desired or necessary in the particular case. The composite sealing means may involve two continuous filaments laid side by side, one of said filaments being susceptible of activation to an adhesive character by any means whatsoever, such as the application of a solvent for the filament, the application of heat, or both together. Preferably, pressure is applied simultaneously with the activating agent. The other filament is not affected by the activating agent and may be termed the non-adhesive element of the composite sealing means, whereas the first-mentioned filament is the potentially adhesive element thereof. The potentially adhesive element may be a filament or a bundle or aggregation of filaments in the form of a yarn, thread, or like twisted or untwisted strand made of such materials as cellulose ethers and esters, vinyl resins, nylons, and the like. Thus, a particularly advantageous form involves a thread or strand in which one or more potentially adhesive filaments or yarns is or are placed with one or more non-adhesive filaments or yarns. These materials may be plasticized to render them more susceptible to activation by heat, so that lower temperatures may be required. Specific examples of the vinyl resins include copolymers of vinyl chloride and vinyl acetate, polymers of vinyl chloride, vinylidene chloride or of ethylene. Preferably the potentially adhesive element is of a thermoplastic material or of a thermosetting material in a thermoplastic condition so that heat alone suffices to render the element tacky or adhesive. In the latter case, the non-adhesive element is non-thermoplastic, by which it is intended to include materials which are not rendered plastic by heating as well as those which may be softened at higher temperatures than the thermoplastic component but is unaffected at the temperature which renders the thermoplastic component tacky. In this embodiment, the sealing strand also provides a tear strip.

Figure 2:
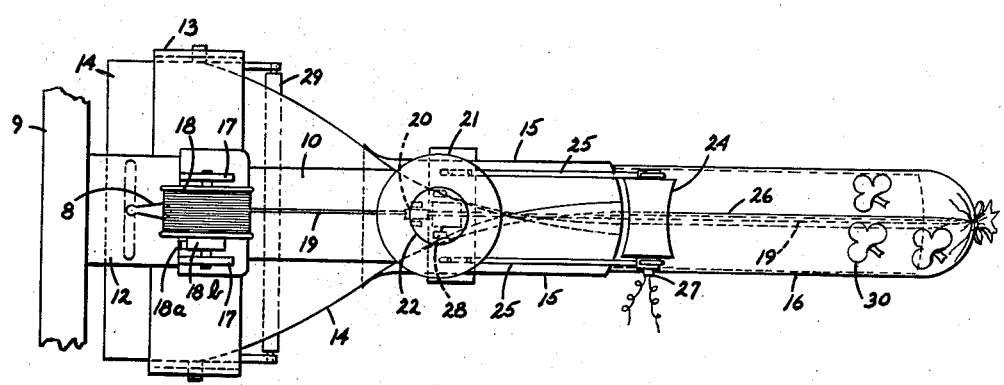
Fig. 2 is a top plan view of the apparatus shown in Fig. 1.
Figure 3:
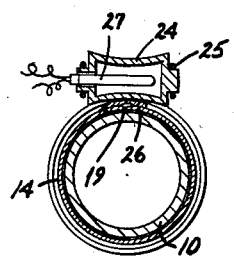
Fig. 3 is a cross-sectional view of the apparatus of Fig. 1 taken along line 3—3 of the embodiment shown in Fig. 1.

In Figures 1 and 2 there are shown two views of one embodiment of the apparatus comprising the combination of a nozzle 10 having a threaded end 11 adapted to screw on the outlet pipe 12 of a conventional sausage meat container 9 to replace the nozzle conventionally used thereon. Since the meat in the container 9 is customarily placed under hydraulic pressure, the valve 8 is adapted and arranged to control the flow of the meat through the nozzle in the usual manner. On the underside of the nozzle 10, there is mounted a bracket 13 adapted to support a roll of casing-forming sheet material 14. On each side of the nozzle there is mounted a tube-former 15 which encircles the nozzle and is arranged to shape the sheet material into a tubing 16 about the nozzle. A bracket 17 is also provided for rotatably supporting a supply spool 18 for the strip or thread of sealing material 19. The bracket may be supported in any fashion, either directly on the nozzle or separately therefrom. A drag or brake shoe 18a is urged by a spring 18c against a drum 18b secured to the spool shaft in order to properly tension the strip 19 during withdrawal. A guide or pulley 20 is mounted on the nozzle in line with the overlapped edges of the sheet within the former 15. There may also be detachably mounted on the nozzle 10 a liquid reservoir 21 for a solvent, having a lid 22 and means such as a wick 23 for applying the solvent to the top of the pulley 20 which carries it to the strip 19 on its way to form a longitudinal seam 26. An arcuate roller 24 supported on a forked spring 25, is positioned to apply pressure to the seam 26. The roller 24 may be hollow and may be provided with heating means, such as any form of electric heating coil or lamp, e. g. an infra-red ray lamp 27. Also, if desired, means may be provided to heat the strip 19 just before it is laid between the overlapped edges of the sheet being formed into a tube. For example, a heating element 28 may be secured in, on, or above the nozzle 10 between the pulley 20 and the roll 24, preferably in advance of the position of overlap of the edges of the sheet to be sealed so that strip 19 passes in contact with the heating element 28 or sufficiently close that its surface is heated to an adhesive condition. Depending on the particular materials to be sealed and rendered adhesive, either or both of the heating means 27 and 28 may be employed. When the nature of the material passing through the nozzle 10 requires the avoidance of excessive heating, the nozzle should be made of a material that has extremely low heat conductivity or it should be shielded from the heating means 27 and/or 28 by a layer of insulating material.

It is desirable to feed the sheet material in such a position that the center and the edges of the sheet are displaced an equal distance from the longitudinal axis of the nozzle. This is done, according to the embodiment of the invention shown in Figures 1 and 2, by forming the nozzle 5 with a reverse curve at the end adjacent to the meat container, and there is provided a guide roller 29 which is so positioned that its upper surface lies in the same plane with the axis of the free end of the nozzle 10. Thus, when the roll of sheet material is passed over this roller it is roughly at the same level as the center of the nozzle and is suitably positioned for the formation of the tubing. It is to be understood that the nozzle may be reversed so that the roll 14 is positioned on the top side of the nozzle while the strip supply and cooperating elements are on the under side, in which case the seam is formed on the under side of the nozzle. Instead of using a wick 23, an equivalent means such as a roller or disk which dips into the solvent and then contacts the strip may be employed, and such alternative means is particularly advantageous when the nozzle is reversed.

In the operation of this invention the sheet material 14 is passed over the guide roller 29 through the forming means 15 and shaped thereby into a continuous tubing 16 having overlapping edges to form a seam 26. The sealing strip 19 after once being adhered between the overlapped edges of the sheet is continuously drawn between the overlapping edges under the control of pulley 20 and a solvent is applied to the strip by wick 23 to render the strip adhesive or it is heated to an adhesive condition either by element 27 or 28 or both. If desired the solvent may be applied together with heat either by element 27 or 28 or both in order to produce the tacky or adhesive condition desired. The edges are pressed together by means of the arcuate roller 24 bearing on the upper surface of the nozzle. The flow of the sausage meat is controlled by means of the valve 8 and, if desired, the stuffed casing is twisted at intervals to provide sausage links.

In view of the face that the casing of the present invention is formed from a sheet material, a number of important commercial advantages arise therefrom. For example, it is difficult to apply a moisture-proof composition to the seamless casings heretofore employed, while it is a relatively simple matter to apply such a moisture-proof composition to one side of the sheet material used in the present invention. The coated sheet material is then formed into a tube and stuffed according to the present invention with the moistureproof coating on the outside. To prevent the moistureproof coating from interfering with the sealing of the sheet by means of certain of the adhesives, one can leave the edges of the sheet material free of coating, or if the sheet is coated over its entire surface the coating may be removed in a preliminary operation by the application of a solvent therefor and a wiping roll.

The sheet material employed in forming the casing may be pre-stretched, and in the now preferred embodiment the sheet material is pre-stretched longitudinally, whereby there is imparted to the casing the ability to stretch transversely to a substantial extent without stretching longitudinally. Thus the casing may expand and shrink during the stuffing and curing, but when the sausage is hung in the smoke room, the casing will not tend to elongate and thus give a stuffed sausage having relatively square shoulders which are desirable.

The sheet material may also be pre-printed before being formed into tubing and since the casing material may be printed in sheet form, considerable economies can be achieved in the case of printing, since the printing may be applied to a roll of full mill width and the printed roll then slit into strips of the width required to form casings. Thus the present invention may provide a seamed casing bearing indicia 30 thereon as shown in Figure 1. When the printing is applied on the outside, the ink may be any conventional ink which will adhere to the casing during the operations of stuffing, cooking, and which will be resistant to the action of grease, smoke and water. However, unlike the seamless tubing heretofore used, the present seamed casing may be pre-printed and folded so that the printing is located on the inner surface of the casing and is viewed through the transparent casing. In this case, it may be desired to employ an ink comprising an approved fat-soluble food dye which will transfer from the inner walls of the casing to the surface of the meat stuffed therein, so that the meat will bear the printing after the casing has been stripped from the sausage. There is thus provided a "skinless" sausage bearing printing or other indicia.

It must be realized in carrying out this invention that the foregoing description shows but few of numerous embodiments thereof, and it will be obvious that numerous variations and mechanical equivalents may be substituted to attain the same ends. For example, there is shown in Figures 1 and 2 a complete casing-forming nozzle which may be sold as a unit and substituted on a conventional sausage making machine for the nozzle used thereon prior to the present invention. Certain parts of the tube-forming means, e. g. the brackets with the roll 14 of sheet material and/or the spool 18, and/or the solvent reservoir and cooperating parts, may be attached integrally to the meat container itself or mounted upon a separate support. Alternatively, the entire casing-forming nozzle may be made an integral part of the stuffing machine as originally manufactured. Further, the roll 14 may be enclosed in a housing of conventional design to protect the sheet material from dust and contamination. When it is desired to pre-wet the casing material before stuffing, this can readily be done by having the roll 14 immersed in a water bath, or suitable guide rolls provided for passing the sheet from the roll through a water bath or through a spray of water prior to the sheet being formed into a tube. It has been found that even though the sheet may be wet, a rapid sealing of the overlapping layers at the seam can still be effected by the strip. The shrinking of the wet tubing is desirable in packing certain meat products containing water because the wet casing on drying shrinks and follows the contraction of the meat product. It is also to be understood that instead of the pressure roll 24, there may be employed equivalent mechanical means such as a shoe adapted to press on the seam or a positively rotatably stiff brush adapted to wipe the area of the seam.

Instead of using an alkali-soluble water-insoluble cellulose material for making the tubing, there may be employed other solvent-soluble sheet materials, such as regenerated cellulose and films of organic solvent-soluble cellulose ethers as a class, cellulose esters as a class, and organic solvent-soluble synthetic resins as a class. However, to permit continuous and rapid production of the tubing, the sealing means for any particular sheet material must be one which produces immediately a strong seam, preferably an autogenous sealing of the contiguous layers of the sheet material; for example, with the solvent-soluble sheet materials and/or strips the seam may be formed by use of a solvent, with or without heat. For example, with regenerated cellulose the seam may be formed by use of a rapidly acting regenerated cellulose solvent adhesive, such as tribenzylmethyl ammonium hydroxide or an aqueous solution containing 10% sodium hydroxide and, if desired, 8% dissolved alkali-soluble water-insoluble cellulose ether; with a strip and sheeting formed of cellulose acetate or a copolymer of vinyl chloride and vinyl acetate, a sealing solvent such as acetone may be employed or heat alone or together with acetone; and with an organic solvent-soluble ethyl cellulose, there may be employed as a sealing solvent ethyl acetate.

The seamed tubing and its method of formation according to the present invention readily permits the use of a tear strip or rip cord in the tubing. For example, a narrow strip or thread may be fed concurrently with the sealing strip about the guide roll 20 so that the tear strip or tear cord is located at the seam.

The web of casing material may contain reinforcing fibers. For example, a multiplicity of loose natural or artificial short fibers may be dispersed in a solution of the alkali-soluble water-insoluble cellulose material and the solution formed into a web. Alternatively, a thin tissue paper formed of natural or artificial fibers may be impregnated and coated with a solution of the alkali-soluble water-insoluble cellulosic material which is coagulated by treatment with an acid, washed and dried. The presence of the loose fibers or of the tissue paper does not interfere with the sealing of the sheet material by the alkaline adhesive. The coatings containing fibers are stronger, less expansible and more opaque. Therefore, such fibrous casings are especially adapted for liver sausage and the like.

While reference has been made, for purposes of description, to the preparation of sausages, it is to be understood that the invention is not limited to such stuffed products but is equally advantageous for the production of encased stuffed products of plastic nature, such as ice cream, fats, scrapple and other meat products, as well as cheese, lard, oleomargarine, greases, snuff, caulking compound, and other products normally stuffed into casings, and in the appended claims the expression "stuffed products" is intended to include all such products.

The present invention has numerous advantages in the production of both frankfurters and large size sausages. The invention provides for a continuous process which results in substantial economies in manufacture, reduces labor requirements and increases the output per machine. As the casings are always uniform in diameter, the product is more uniform than when individual casings are stuffed according to prior practice. Further, since the present process produces a casing from a flat sheet, the sheet may be printed with an all-over design extending to the edges, thus permitting the design in the finished stuffed sausage to extend completely around the sausage. The use of a flat sheet also permits economies in moistureproofing or otherwise coating the sheet material before its formation into a casing. Moreover, when the tubing is formed from a soluble sheet material and utilized in the manufacture of so-called "skinless" frankfurters, the stripped casings may be cleaned, redissolved and recast into sheet material for the further production of tubing. This re-use of the stripped casing is not possible with the regenerated cellulose casings heretofore used in the manufacture of "skinless" frankfurters because it is not practical to redissolve the regenerated cellulose for the formation of additional viscose tubing owing to the chemical degradation which occurs when such films are rexanthated. Numerous other advantages will be obvious to those skilled in the art.

The foregoing description is merely illustrative of the invention and is not a limitation thereof, and it is to be understood that the scope of the invention will be defined in the following claims.

We claim:

1. In an apparatus for the production of stuffed products, the combination of a stationary stuffing nozzle having an arcuate external conduit wall terminating in an open end for discharging a stuffing material therefrom, conduit means for directing a stuffing material into the other end of the nozzle, folding means adjacent the nozzle comprising an arcuate member having an internal guiding surface spaced from and extending around the nozzle wall to permit continuous passage of a sheet of flexible material between said internal guiding surface and the nozzle for folding the sheet about the nozzle and discharging it toward the discharge end of the nozzle with its opposite lateral edges overlapped in the form of a tubular casing, means adjacent the nozzle for supplying a self-sustaining strip of sealing material, means adjacent the folding means for guiding the strip of sealing material longitudinally from the supply means to a position between the overlapped edges, means adjacent said guiding means and said folding means for heating the strip as it passes to said position, a rotatable element adjacent the wall of the nozzle near the discharge end of the arcuate folding member, and means for urging the element toward said wall for applying pressure to the overlapped edges of the sheet passing between the element and the wall.

2. Apparatus as defined in claim 1 having means for heating the rotatable pressure element.

HENRY H. WRIGHT.
CLARENCE L. HARDER.

References Cited in the file of this patent

UNITED STATES PATENTS

| Number | Name | Date |
| --- | --- | --- |
| 1,510,243 | Perry | Sept. 30, 1924 |
| 1,712,454 | Spencer | May 7, 1929 |
| 2,142,505 | Gammeter | Jan. 3, 1939 |
| 2,169,936 | Wagner | Aug. 15, 1939 |
| 2,203,924 | Pletscher | June 11, 1940 |
| 2,234,054 | Mason | Mar. 4, 1941 |
| 2,490,930 | Thompson | Dec. 13, 1949 |

FOREIGN PATENTS

| Number | Country | Date |
| --- | --- | --- |
| 91,246 | Sweden | Oct. 31, 1934 |